United States Patent [19]

Hines

[11] 4,374,611

[45] Feb. 22, 1983

[54] COMPACT X-Y POSITIONING MECHANISM FOR MICROFICHE

[75] Inventor: Stephen P. Hines, Glendale, Calif.

[73] Assignee: Eastman Kodak Company, Rochester, N.Y.

[21] Appl. No.: 270,939

[22] Filed: Jun. 5, 1981

[51] Int. Cl.³ .............................................. G03B 23/08
[52] U.S. Cl. .................................... 353/27 R; 353/95; 355/75; 33/1 M
[58] Field of Search .................. 353/25, 27 R, 22, 23, 353/95, 96, 120; 33/1 M; 355/53, 54, 75, 72, 74; 74/110; 308/3 A, 4 R, 6 R; 108/102, 137; 248/646, 660

[56] References Cited

U.S. PATENT DOCUMENTS

| | | | |
|---|---|---|---|
| 1,245,324 | 11/1917 | Droitcour | 308/3 A |
| 2,256,178 | 9/1941 | Stuart | 353/27 |
| 3,563,645 | 2/1971 | Burke et al. | 353/27 |
| 3,790,266 | 2/1974 | Ueda et al. | 353/95 X |
| 3,967,890 | 7/1976 | Wells | 353/25 X |
| 4,077,708 | 3/1978 | Freiberg et al. | 353/27 |
| 4,262,974 | 4/1981 | Tojo et al. | 308/3 A X |

OTHER PUBLICATIONS

Giedd, "Precision X-Y Table", IBM Technical Disclosure Bulletin, vol. 13, No. 6, (Nov. 1970).

Primary Examiner—Stephen Marcus
Assistant Examiner—William Sharp
Attorney, Agent, or Firm—Thomas H. Close

[57] ABSTRACT

A compact, smoothly operating, X-Y positioning mechanism for use in microfiche projecting apparatus is disclosed. The positioning mechanism occupies an area substantially the same size as one microfiche, however is displaceable over an area approximately four times as large. Smooth translation of the positioning mechanism is provided by two pairs of parallel rollers, the rollers of one pair being disposed perpendicularly to the other pair to allow for positioning in any direction.

2 Claims, 3 Drawing Figures

COMPACT X-Y POSITIONING MECHANISM FOR MICROFICHE

BACKGROUND OF THE INVENTION

1. Field of the Invention

The present invention relates to a microfiche positioning mechanism for moving a microfiche along two perpendicular directions so that selected portions of the microfiche can be positioned in the optical path of a microfiche projection apparatus.

2. Discussion Related to the Problem

Microfiche is a cut-sheet form of microfilm, usually in a 4"×6" rectangular format. Rows and columns of microimages are formed on the sheet, normally at reduction ratios of approximately 20× or 24×. There are normally sixty such microimages on a microfiche at 20× and ninety-six at 24× reduction. The microimages are enlarged in a projection apparatus for viewing and/or printing. Usually, the microfiche is placed in a holding frame or carrier in such apparatus and the carrier is positioned by hand to select the desired microimage for projection.

One problem with most prior art X-Y positioning mechanisms for microfiche is that they exhibit a characteristic "stick-slip" feel caused by friction. When a force is applied to such prior art positioning mechanism, they initially resist movement (i.e. stick) then suddenly lurch (i.e. slip) to a new position. This "stick-slip" behavior makes it difficult to smoothly achieve accurate positions—causing the operator to overshoot a desired position, and resulting in "hunting" for the final position. Another problem associated with prior art X-Y positioning mechanisms is their size. In order to place all the microimages carried by the microfiche into the optical path of the projection mechanism, it is necessary to displace the microfiche over an area approximately four times the area of the fiche itself. Even in some prior art "compact" microfiche readers, the positioning mechanism covers approximately four times the area of one fiche. See for example U.S. Pat. No. 3,563,645 issued Feb. 16, 1971 to F. A. Burke et al. Thus the problem faced by the inventor is to provide a smoothly operating, compact X-Y positioning mechanism for a microfiche projection apparatus.

SOLUTION OF THE PROBLEM—SUMMARY OF THE INVENTION

The above-noted problems are solved according to the present invention by providing the X-Y positioning mechanism having two pairs of parallel cylindrical rollers, the rollers of one pair being disposed perpendicularly to the rollers of the other pair. The first pair of rollers is adapted to roll on a bearing surface which is substantially the size of one microfiche and is fixed with respect to the microfiche projecting apparatus. The bearing surface has a central aperture for the optical path of the projection apparatus. The second pair of rollers is supported by, and is adapted to roll perpendicularly to, the first pair of rollers. A microfiche carrier is supported by and is adapted to roll on the second pair of rollers such that (i) upon movement of the first pair of rollers in a first direction, the microfiche carrier moves in concert with the second pair of rollers by an amount twice the amount of motion of the first pair of rollers, and (ii) upon movement of the second pair of rollers by a certain amount, the microfiche carrier moves in the same direction by twice the amount. Combinations of the two perpendicular motions allow for positioning of the microfiche carrier in any direction without rotation of the microfiche. Since the only substantial friction inherent in the positioning mechanism is the rolling friction of the rollers, the familiar "stick-slip" feel of many prior art X-Y positioning mechanisms is avoided. In a preferred embodiment of the invention, the pairs of rollers are held in respective frames and an intermediate bearing plate is disposed between the two pairs of rollers. The frames include means cooperating with the bearing surface, the intermediate bearing plate, and the microfiche carrier for loosely holding the microfiche positioning mechanism together.

BRIEF DESCRIPTION OF THE DRAWINGS

The invention will be described with reference to the accompanying drawings, wherein.

DESCRIPTION OF THE PREFERRED EMBODIMENTS

Figure 1:
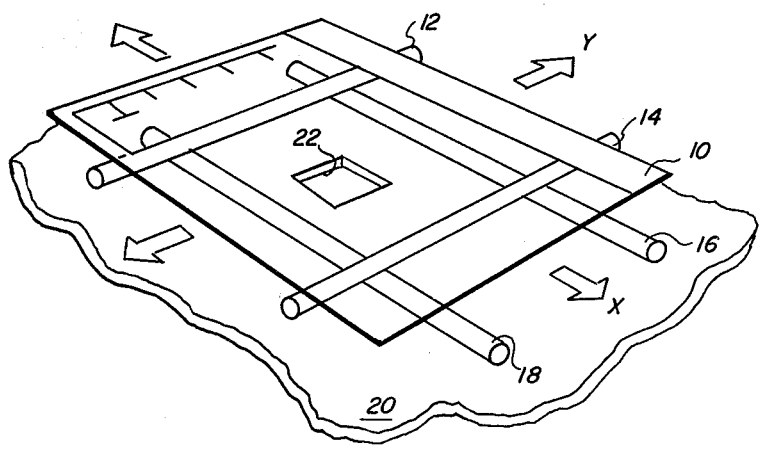
FIG. 1 is a schematic diagram illustrating the principle of operation of the compact X-Y positioning mechanism according to the present invention.

Refer now to FIG. 1, where the general principle of operation of the X-Y positioning mechanism according to the present invention is explained. The microfiche 10 rests on a pair of parallel rollers 12 and 14 having their axes of rotation aligned in the Y-direction, which allows the microfiche to be translated in the X-direction. These rollers (12 and 14) are in turn supported by a pair of parallel rollers 16 and 18 having their axes of rotation oriented in the X-direction, which allows the microfiche (along with rollers 12 and 14) to be translated in the Y-direction. Rollers 16 and 18 are disposed to roll on a bearing surface 20 fixed with respect to the projection apparatus. Bearing surface 20 has a central aperture 22 for the optical path of the projection apparatus. Combinations of the X and Y motions afforded by the two pairs of rollers allows the microfiche to be translated in any direction (without rotation). The only substantial friction inherent in the mechanism is rolling friction, which is extremely low, thereby avoiding the "stick-slip" feel of many prior art X-Y positioning mechanisms for microfiche.

Furthermore, when the microfiche is moved, say in the X-direction, by a given amount, rollers 12 and 14 are only displaced by one-half that amount. For this reason, the positioning mechanism can be designed to occupy, when centered, an area approximately the same as the area occupied by the microfiche to be projected, thereby providing a truly compact X-Y positioning apparatus.

Figure 2:
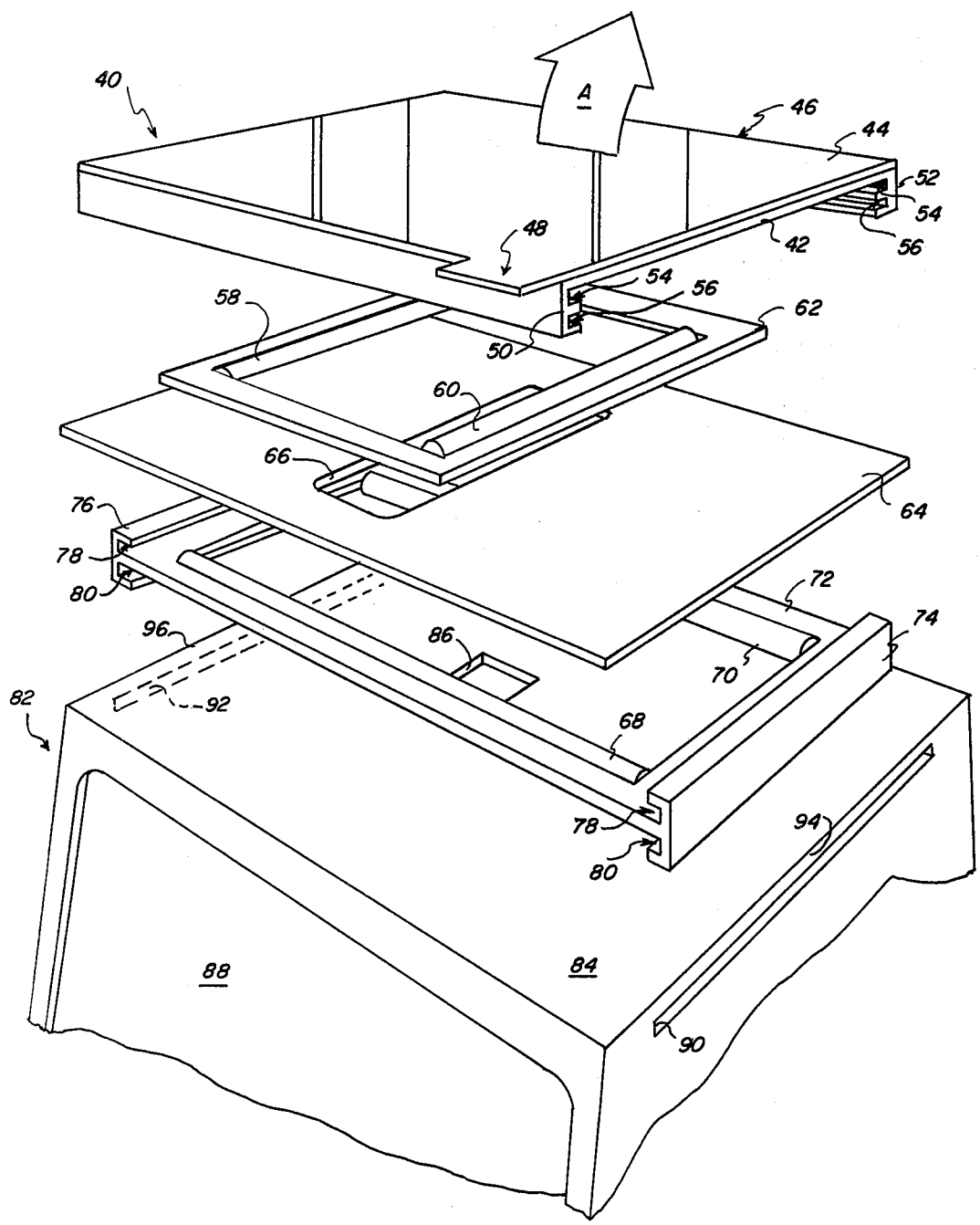
FIG. 2 is an exploded perspective view of a preferred embodiment of the microfiche positioning mechanism according to the present invention.

FIG. 2 is an exploded view of a presently preferred embodiment of the compact X-Y positioning mechanism employed in a microfiche viewing apparatus. The microfiche (not shown) is carried in a microfiche carrier generally designated 40 having a transparent bottom plate 42 and a transparent top plate 44. Top plate 44 is hinged to bottom plate 42 along the back edge 46. The microfiche carrier 40 is made, for example, from clear plastic. Top plate 44 forms a tab 48 for tilting the top plate about the rear hinge (not shown) in the direction of arrow A. The microfiche to be viewed is placed between the top and bottom plates and the top plate is lowered. Attached to or integrally formed with bottom plate 42 is a pair of parallel side rails 50 and 52 oriented in the X-direction, which define two pairs of inwardly facing grooves 54 and 56. A first pair of parallel cylindrical rollers 58 and 60, oriented in the Y-direction, are journaled in a frame 62. Preferably, rollers 58 and 60 are metal rollers covered with a non-slip rubber or plastic cladding. Frame 62 is adapted to be located loosely in the upper pair of parallel grooves 54 defined by side rails 50 and 52, such that rollers 58 and 60 contact the lower side of bottom plate 42 (as viewed in FIG. 2).

An intermediate bearing plate 64, having an elongated central aperture 66, is adapted to be loosely held in the lower pair of parallel grooves 56 in side rails 50 and 52, such that rollers 58 and 60 contact the upper surface (as seen in FIG. 2) of the bearing plate 64. A second pair of parallel cylindrical rollers 68 and 70, similar to parallel rollers 58 and 60, oriented in the X-direction, are journaled in a frame 72. Attached to or integrally formed with frame 72 is a pair of parallel side rails 74 and 76 oriented in the Y-direction, which define two pairs of inwardly facing grooves 78 and 80. Intermediate bearing plate 64 is adapted to be loosely received in the top pair of parallel grooves 78 such that rollers 68 and 70 contact the lower surface (as seen in FIG. 2) of the bearing plate 64. A portion of a housing 82 of the microfiche viewing apparatus is shown. The top of the housing defines a plane bearing surface 84 approximately the size of one microfiche, and having a central aperture 86 for the optical path of the projection system in the viewing apparatus. Central aperture 66 in bearing plate 64 is about the same width as aperture 86, and about four times as long. A back projection screen 88, for viewing the projected microimage, is contained in the front of housing 82.

Figure 3:
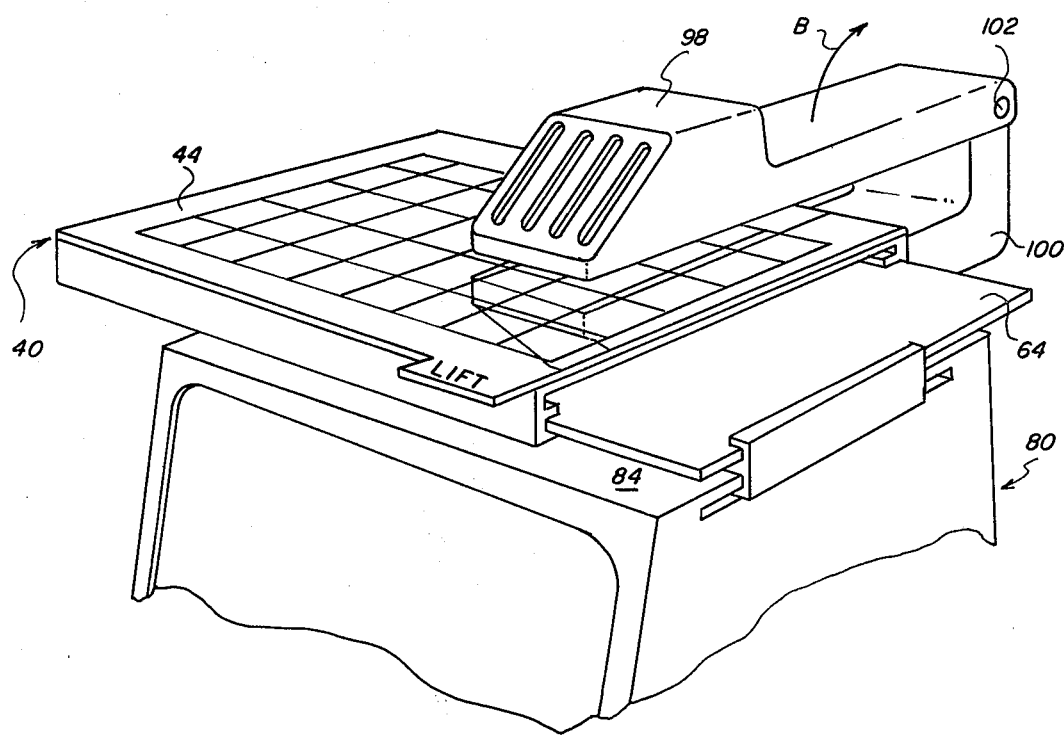
FIG. 3 is a perspective view of the assembled X-Y positioning mechanism shown in FIG. 2.

A pair of parallel slots 90 and 92 are formed in the sides of the housing near bearing surface 84, to define a pair of parallel edges 94 and 96 extending in the Y-direction on bearing surface 82. The parallel edges 94 and 96 are adapted to be loosely received in the lower pair of inwardly facing grooves 80 in side rails 74 and 76 of frame 72, such that parallel rollers 68 and 70 contact bearing surface 84. FIG. 3 shows the assembled X-Y microfiche positioning mechanism according to the present invention. Also shown in FIG. 3 is a light source and condensing lens assembly 98 that is pivotally mounted on a cantilever arm 100 attached to the projector housing 80. Light source and condenser lens assembly 98 is adapted to be pivoted about hinge 102 in the direction of arrow B when the top cover plate 44 for fiche carrier 40 is lifted to insert or remove the microfiche.

As can be seen in FIG. 3, when the X-Y positioning mechanism is centered, it occupies an area only slightly larger than one microfiche, thus making the viewer compact for shipping or carrying. However, when in use, the microfiche carrier can be translated over an area approximately four times the area of one microfiche so that all of the microimages on the fiche can be positioned in the optical path of the viewer.

The invention has been described in detail with particular reference to a preferred embodiment thereof, but it will be understood that variations and modifications can be effected within the spirit and scope of the invention.

I claim:
1. In a microfiche projecting apparatus, a compact X-Y positioning mechanism for microfiche, comprising:
a first bearing surface, fixed with respect to the microfiche projecting apparatus, said first bearing surface being substantially as large as the microfiche to be viewed, and having a central aperture therein for the optical path of the projecting apparatus;
first roller means, including a first pair of cylindrical rollers mounted in parallel spaced relation for rolling movement on said first bearing surface in a first direction;
second roller means, including a second pair of cylindrical rollers mounted in parallel spaced relation for rolling movement in a second direction, generally perpendicular to said first direction; an intermediate bearing plate disposed between said first and second roller means, said bearing plate having a central aperture approximately four times as large as said aperture in said first bearing surface in said first direction, and approximately the same size as said aperture in said first bearing surface in said second direction, so that upon movement of said first roller means in said first direction by a certain amount, said second roller means is moved in said first direction by twice that amount; and
microfiche carrier means for supporting a microfiche in a plane generally perpendicular to the optical axis of an optical system used to view the microfiche, said microfiche carrier means having a bearing surface and being disposed relative to said second roller means such that said bearing surface is borne by said second pair of rollers, such that upon movement of said first roller means in said first direction, said microfiche carrier means moves in concert with said second roller means, and upon movement of said second roller means in said second direction by a certain amount, said microfiche carrier means is moved in said second direction by twice that amount,
whereby a smoothly operating microfiche positioning mechanism occupying approximately the area of one microfiche but capable of translating over an area approximately four times the area of one microfiche, is provided.
2. The invention claimed in claim 1 wherein:
said first roller means further includes a first frame in which said first pair of rollers is mounted for axial rotation, said first frame including guide means cooperating with the first bearing surface to restrict the movement of said first roller means relative to said surface to movement in said first direction, and cooperating with said intermediate bearing plate to restrict movement of said bearing plate relative to said roller means to movement in said first direction;
said second roller means includes a second frame in which said second pair of rollers is mounted for axial rotation; and
said microfiche carrier means includes guide means cooperating with said bearing plate and said frame of said second roller means to restrict relative movement between said microfiche carrier means, said bearing plate, and said second roller means to movement in said second direction.

* * * * *